US011601290B2

(12) United States Patent
Qiu et al.

(10) Patent No.: US 11,601,290 B2
(45) Date of Patent: Mar. 7, 2023

(54) CENTRALIZED DATABASE WITH PROVISIONS TO PREVENT PKI KEY AND SECURITY CERTIFICATE DUPLICATION

(71) Applicant: ARRIS Enterprises LLC, Suwanee, GA (US)

(72) Inventors: Xin Qiu, San Diego, CA (US); Christopher Poli, Doylestown, PA (US); Alexander Medvinsky, San Diego, CA (US); Ting Yao, San Diego, CA (US); Jinsong Zheng, San Diego, CA (US)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

(21) Appl. No.: 17/727,552

(22) Filed: Apr. 22, 2022

(65) Prior Publication Data
US 2022/0353094 A1 Nov. 3, 2022

Related U.S. Application Data (60) Provisional application No. 63/181,831, filed on Apr. 29, 2021.

(51) Int. Cl.
*H04L 29/06* (2006.01)
*H04L 9/32* (2006.01)
*H04L 9/30* (2006.01)

(52) U.S. Cl.
CPC ............ *H04L 9/3268* (2013.01); *H04L 9/302* (2013.01); *H04L 9/3066* (2013.01)

(58) Field of Classification Search
CPC ...... H04L 9/302; H04L 9/3268; H04L 9/3066
See application file for complete search history.

(56) References Cited

U.S. PATENT DOCUMENTS 9,130,928 B2  9/2015  Qiu et al.
10,162,944 B2  12/2018  Makam et al.
(Continued)

FOREIGN PATENT DOCUMENTS

WO  2018121797 A1  7/2018

OTHER PUBLICATIONS

International Search Report and Written Opinion RE: Application No. PCT/US2022/26036, dated Aug. 1, 2022.

*Primary Examiner* — Dao Q Ho
(74) *Attorney, Agent, or Firm* — Chernoff, Vilhauer, McClung & Stenzel, LLP (57) ABSTRACT

A system and method for preventing use of invalid digital certificates is disclosed. The method comprises receiving, in a validation service from a requesting entity, a cryptographic asset and a request to evaluate the cryptographic asset, the cryptographic asset uniquely assigned to one of the plurality of devices by an associated one of the commercially distinct entities, the request comprising the cryptographic asset, determining an evaluation state of the cryptographic asset at least in part from a database derived from a plurality of public keys currently assigned to the plurality of devices and previously received by the validation service, determining a disposition of the cryptographic asset according to a disposition policy associated with the determined evaluation state and the device and effecting the determined disposition of the cryptographic asset.

26 Claims, 5 Drawing Sheets

(56) References Cited

U.S. PATENT DOCUMENTS

| | | | |
|---|---|---|---|
| 10,187,375 B1* | 1/2019 | Kincaid | H04L 9/3247 |
| 2004/0030888 A1* | 2/2004 | Roh | H04L 63/0823 |
| | | | 713/156 |
| 2008/0049942 A1 | 2/2008 | Sprunk et al. | |
| 2010/0122081 A1* | 5/2010 | Sato | H04L 9/3263 |
| | | | 713/158 |
| 2014/0281497 A1 | 9/2014 | Medvinsky et al. | |
| 2019/0245701 A1* | 8/2019 | Chen | H04L 9/3247 |
| 2020/0272745 A1* | 8/2020 | Bott | H04L 9/3247 |

* cited by examiner

| Eval State / Disp | Store | Revoke | ... | Message |
|---|---|---|---|---|
| Dup | Yes Dupl | Yes - Only New | ... | Dupl-Revoked |
| Unique | Yes | No | ... | None |
| Valid Unique | Yes | No | ... | None |
| Invalid | No | Yes - Only New | ... | Invalid-Reasons |

CENTRALIZED DATABASE WITH PROVISIONS TO PREVENT PKI KEY AND SECURITY CERTIFICATE DUPLICATION

BACKGROUND OF THE INVENTION

1. Field of the Invention

The present invention relates to systems and methods for providing secure data transmission, and in particular to a system and method for identifying defective cryptographic assets.

2. Description of the Related Art

With the advent of fifth generation (5G) ultra-wideband communications and other technological developments, the applications for wireless communication can be expected to expand to include applications that formerly required a wired communications link. For example, 5G permits high resolution media programs to be wirelessly transmitted to mobile devices.

At the same time, this creates additional risks for such devices to be cloned or to spoof other devices as to their identity. Accordingly, it is critical that such devices be provisioned with a means to prove their identity (key and certificate) unique and to facilitate secure communications. At the same time, such certificates may need to be updated or re-provisioned while the devices themselves are deployed to networks.

Further, since such devices are typically provisioned with digital certificates in a manufacturing facility and the devices are typically manufactured by a plurality of unrelated entities, there is the chance that digital certificates will be generated that have public/private keys that are duplicative of the public/private keys already deployed in other devices.

What is needed is a system and method that detects and prevents, on a system level across multiple manufacturers the use of devices having duplicative security credentials. The present invention satisfies that need.

SUMMARY OF THE INVENTION

To address the requirements described above, the present invention discloses a system and method for preventing use of duplicated keys and digital certificates. In one embodiment, the method comprises receiving, in a validation service from a requesting entity, a cryptographic asset such as a digital certificate and a request to evaluate the cryptographic asset, the cryptographic asset uniquely assigned to one of the plurality of devices by an associated one of the commercially distinct entities, the request comprising the cryptographic asset, determining an evaluation state of the cryptographic asset at least in part from a database derived from a plurality of public keys currently assigned to the plurality of devices and previously received by the validation service, determining a disposition of the cryptographic asset according to a disposition policy associated with the determined evaluation state and the device and effecting the determined disposition of the cryptographic asset. Another embodiment is manifested by an apparatus comprising a processor having a communicatively coupled memory storing processor instructions for performing the foregoing operations.

BRIEF DESCRIPTION OF THE DRAWINGS

Referring now to the drawings in which like reference numbers represent corresponding parts throughout.

DETAILED DESCRIPTION OF PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

As described above, public keys, private keys and certificates are currently generated centrally and distributed to factories for installation on target devices. When all devices are supported by the central key service, duplicate or cloned keys can be detected and thrown away. But in a large network of devices supported by different central key services, it is possible for another of the central key services to generate keys that might be duplicates of a key generated by another central key service supporting another family of devices. The same key service can also sometimes generate duplicate keys. Furthermore, devices can generate their own keypairs and submit their public key in a certificate request and end up with a duplicate public key of another device. Generally, public/private keypairs are randomly generated and all these error cases can occur if the keypair generating entity uses a low-quality random number generator (RNG). Even with a high quality RNG, there is an extremely small chance of this happening. This creates problems in identifying the holder of the public key, and also makes it difficult to distinguish an entity with a legitimate identical public key, and an entity attempting a cloning attack.

Figure 1:
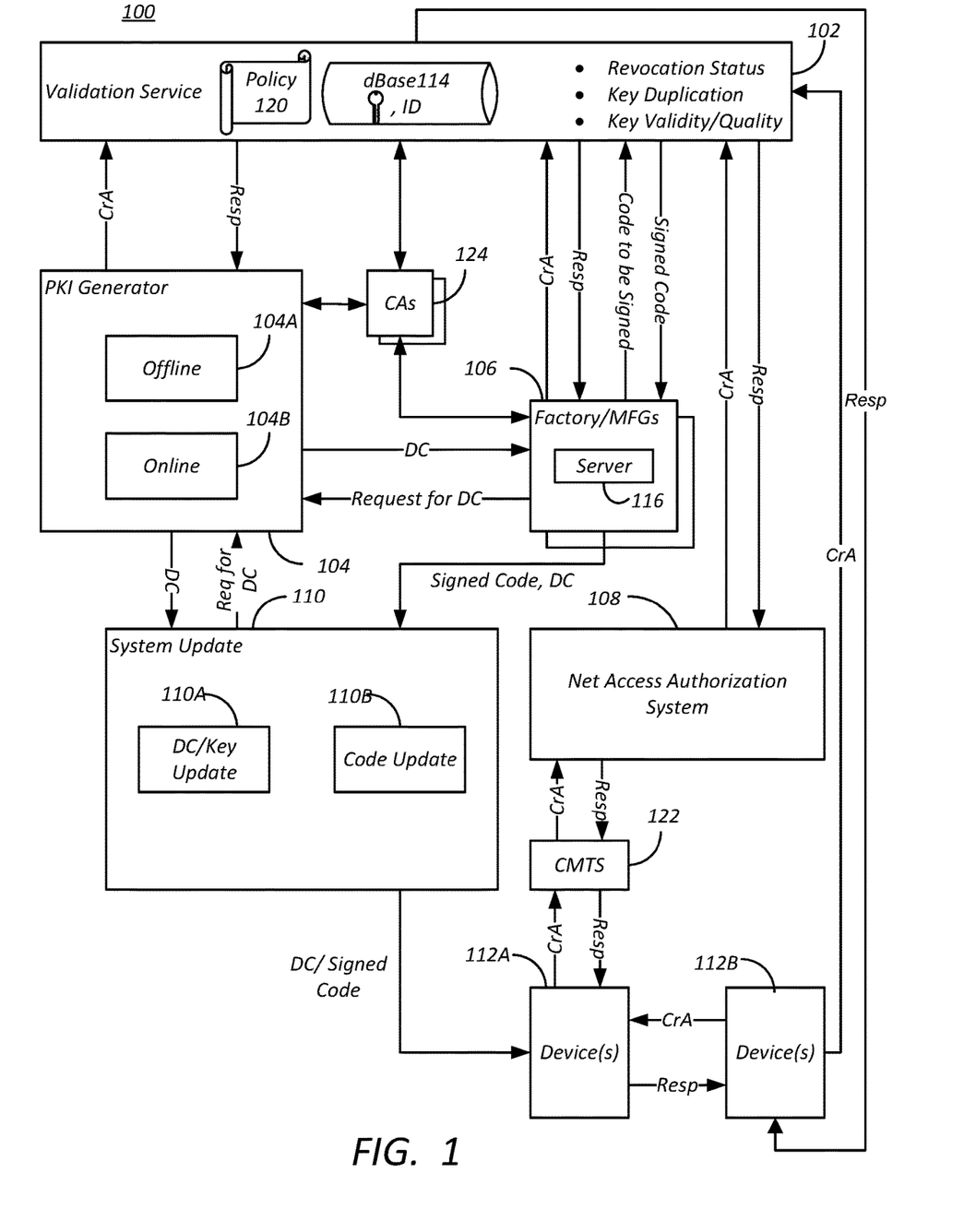
FIG. 1 is a diagram of an embodiment of a cryptographic asset distribution and management system.

FIG. 1 is a diagram of a cryptographic asset distribution and management system 100. In this system, public keys (generated by device factories 106, devices 112, the PKI generator 104 and elsewhere) are provided to a validation service (VS) 102 and replicated in a central database 114 of the VS 102. A protocol is established wherein when an entity (a user device 112 factory server 116, or PKI generator 104) wishes to be authenticated, its public key (particularly for authentication purposes) is forwarded to the to the VS 102, which checks the central database 114 to determine if the forwarded key is duplicated by another key having the same value obtained from another source. If a duplicate is detected, the VS 102 takes appropriate action, as defined by a disposition policy 120 maintained by the VS 102, takes required action. Such action can include notifying the relevant factory 106 or entity to re-provision the device 112 with a non-duplicate key, to replace the duplicate key in the device, and notify the relevant operator of the requesting device in accordance with a disposition policy 120. Alternatively, VS 102 may notify the PKI Generator 104 that it submitted a duplicated public key and request for it to re-generate a different non-duplicate keypair and re-submit another public key. Or in other cases, a device 112 which submitted a public key to VS 102 may be notified to regenerate is public/private keypair and resubmit a new non-duplicate public key. The VS 102 may optionally also keep track of contact information from a previous validation request that resulted in the original certificate in its database with the same public key. In that case, VS 102 may also notify the original owner of that certificate that someone else submitted a duplicate of their public key. The disposition policy 120 may include revoking the duplicated keys/certificates (in which case the duplicate keys of both devices having the same key will need to be re-provisioned with keys, as it is evidence of possible cloning) or simply replacing them. Duplicate keys can be replaced with keys generated, for example, by a PKI generator 104. The PKI generator 104 may be manifested by the online PKI update system (OPUS) described in U.S. Pat. No. 9,130,928, which is hereby incorporated by reference herein.

If there are no issues detected with the public key submitted by VS 102, VS 102 may issue and return a digital certificate for this public key if so determined by its disposition policy 120. In this case, VS 102 stores a copy of the just issued certificate in its database 114 in order to check for duplicates.

It is notable that that multiple verification checks with the VS 102 receiving the exact same certificate is not always a uniqueness problem—this may simply mean that the same device is authenticating with its certificate to multiple services. But when the VS 102 receives a certificate with the same public key but a different subject name from an associated certificate stored in the database 114, the public key and related certificate are rejected as a duplicate because this is an indication that a duplicate public key was generated for multiple subjects.

Alternatively, a digital certificate might be submitted to VS 102 with an additional device identifier such as a MAC Address, IMEI, serial #, IP Address, etc. If the same digital certificate is submitted to VS 102 with two different additional device identifiers, that may be a symptom of cloning where the same digital certificate and private key that is supposed to be unique has been duplicated into multiple devices. Again, in such circumstances, the certificate and private key may be rejected as duplicative.

Yet another circumstance is when VS 102 receives too many validation requests with the same digital certificate, possibly even with the same additional device identifier. When VS 102 is receiving too many such requests with the same certificate within a short period of time—that may indicate a presence of a large number of clones with the same certificate and in this case validation should also fail. Assets associated with the duplicated certificate can also be determined to be invalid.

In one embodiment, a standards body (for example, one standard body for each jurisdictional region or country or a global standards body of participants with a vested interest) implements regulations defining how security among devices 112 is to be implemented, including anti-cloning and traceability. Such regulations can be implemented in the disposition policy 120 enforced by the VS 102, which assure only unique public keys are used.

In this architecture, public and private keys are generated for each device 112 (such as a cell phone or cable modem) by the device 112 itself, a factory server 116 of the factory 106 producing the device or the PKI generator 104. After the keys are generated, a factory server 116 or PKI generator 104 generates the corresponding digital certificate. The device 112, factory server (or any provisioning servers that may not reside in factory such as an online provisioning server such as OPUS) 116 or PKI generator 104 then transmits the public key of the key pair to the VS 102, which stores the received public key along with other public keys received from other sources in the central database 114. VS 102 may also issue a digital certificate (if specified by its disposition). Device 112 may have previously obtained a digital certificate for its public key, e.g., from some online CA. If a duplicate key is found, the VS 102 implements the disposition policy 120, and informs the relevant entity (PKI generator 104 or factory server 116 or a device 112) to have the duplicate keys canceled. Replacement keys may be generated in by the PKI Generator 104 or the factory server 116 or by devices. The produced device with the duplicate public key (and hence, a duplicate private key) would then be put back into the production line to remove the duplicate keys and regenerate a key pair for installation. Alternatively, this device may be located at subscriber's location or a warehouse and the updated certificate will enable it to successfully authenticate to another device or a service.

Communications between the factory server 116 and the VS 102, the PKI Generator 104 and the VS 102 and the PKI Generator 104 and the factory server 116 are performed via a secure link.

In one embodiment, the system 100 also provides anti-cloning and anti-duplication for devices already deployed and in use by end users. For example, a national 5G network includes many network elements and a plurality of currently disconnected operators. The system 100 can be used to detect user devices 112 having the same (cloned) public key. Devices 112 such as cable modems, automobiles having transceivers and the like sign onto the network and disappear/reappear on different part of the networks over time. For example, when in motion, a cable modem may contact the CMTS 122 to log on to or register with the DOCSIS HFC network. Such devices provide a digital certificate having a public key and device ID to allow the device to operate on the network. The digital certificate is used to authenticate the device 112. In addition to the typical methods of such authorization, an additional anti-cloning check can be made by sending the digital certificate (or simply the public key associated with the digital certificate) to the VS 102 to check the database 114 to determine if the same public key has already been issued to another device 112 (in other words to a different subject name in the certificate or associated with a different additional device identifier). In this case, the VS 102 may operate as a central authority that is run on behalf of a specific government, national, or group network that allows only one unique device to operate per public key. This authentication check can also use information regarding movement of the device 112 within a network (manifested by contacting different CMTSs 122) and also movement from a first network to a second network commercially independent from the first network.

In one embodiment, the VS 102 checks other issues with public keys provided for assessment. Additional verification can reject the offered public key if, for example: (1) the key size is too small, (2) if the public key is an elliptic curve key, and the key is not on a specified ECC curve, or (3) the exponent of the (RSA) public key is too small (e.g. disallow the public exponent e is less than 65537). Such requirements may differ among different applications or different customers.

At the time the device 112 is deployed and first used to access a DOCSIS or similar network (e.g. via CMTS 122), a near real-time anti-cloning/anti-duplication check can be made. The CMTS 122 receives the public key of the device 112, and forwards the public key to the VS 102 via a net access authorization system 108.

Figure 2:
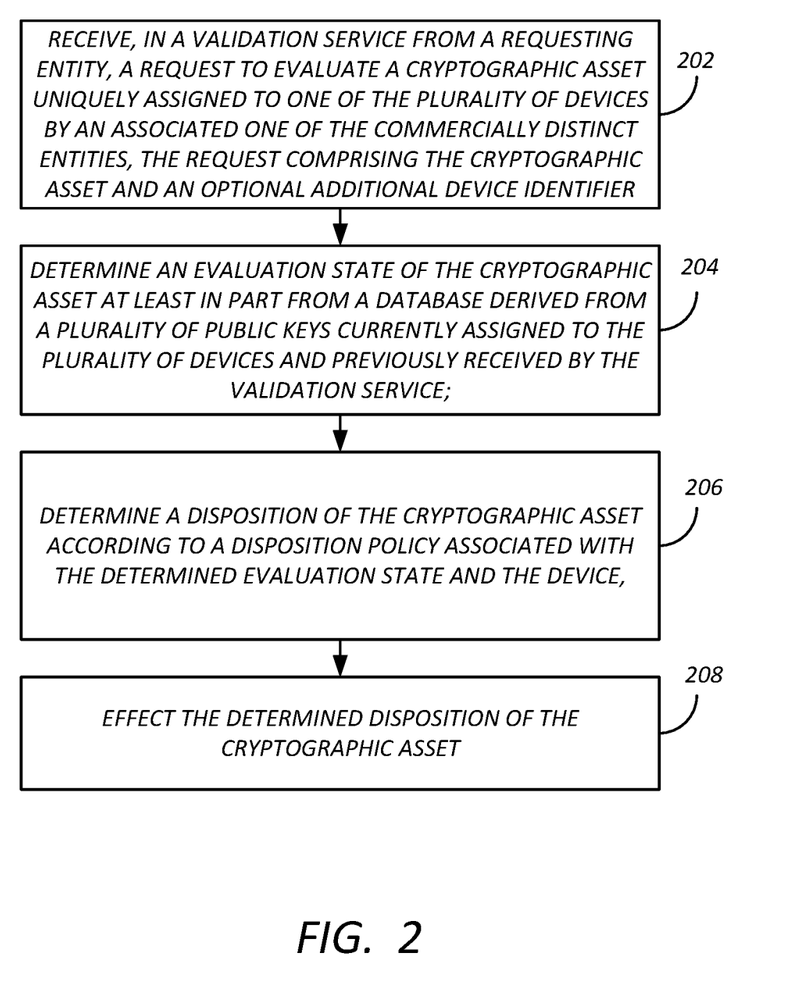
FIG. 2 is a diagram illustrating exemplary operations used to manage cryptographic assets.

FIG. 2 is a diagram illustrating exemplary operations used to manage cryptographic assets. In block 202, a request to evaluate an existing pre-generated cryptographic asset uniquely assigned to a device is received.

In one embodiment, the cryptographic asset that is the subject of the request was generated before the request and has been uniquely assigned to a device (for example, by one of a plurality of commercially distinct entities such as the factories 106 producing the devices 112). This is distinguished from, for example, a cryptographic asset that was initially generated for further use (for example, by offline PKI Generator 104A) but has yet to be uniquely associated with a particular device 112. For example, a private/public key pair generated by the offline PKI Generator 104B and stored either by the PKI Generator 104 or the factory 106 (or an online provisioning update server, such as OPUS) for later assignment or storage by the device 112 has not been uniquely assigned to the device. In another embodiments, any existing pre-generated cryptographic asset, whether uniquely assigned to or stored in the device 112 can be the subject of the request.

In one embodiment, the cryptographic asset comprises a digital certificate, which includes the public key of the subject device 112, an identifier of the subject device 112 and a signature of the body of the certificate by the a private key of the an associated certificate authority (CA) 124. The body of the digital certificate may also include a digital certificate ID or serial number that uniquely identifies the digital certificate, the temporal validity of the digital certificate, the public key belonging to the subject device, and an identifier of the algorithm used to sign the certificate body with the CAs private key. In another embodiment, the cryptographic asset comprises only the public key of the device 112. The cryptographic asset may be received from any of a plurality of commercially distinct entities such as factories 106 that produce or manage the devices 112, from the devices 112 themselves, directly, or through intermediary entities such as the PKI Generator 104 or Net Access Authorization System 208, or from a CA 124.

In addition to the cryptographic asset, VS 102 may also receive an additional device identifier associated with the device 112 such as a MAC Address or IMEI which is outside of the signed digital certificate.

Figure 3:
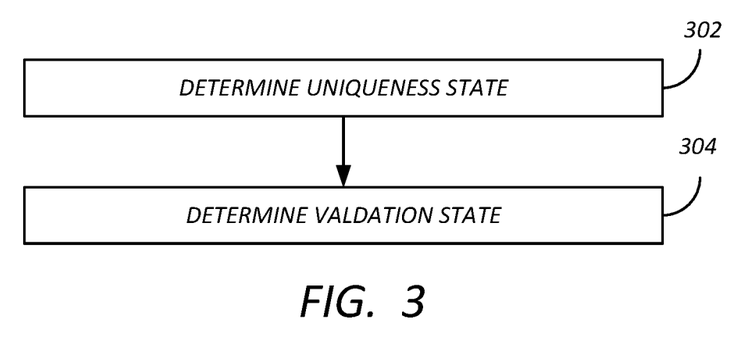
FIG. 3 is a diagram illustrating exemplary operations used to determine the evaluation state.

In block 204, the evaluation state of the cryptographic asset is determined, using the database 114. In one embodiment, the evaluation state of the cryptographic asset includes a uniqueness state and an optional validation state. FIG. 3 is a diagram illustrating exemplary operations used to determine the evaluation state, with the uniqueness state determined in block 302 and the validation state determined in block 304.

The uniqueness state refers to whether the cryptographic asset is globally unique. In cases where the cryptographic asset includes a public key, this is determined by determining if the public key included with the request (or included with the digital certificate that is included with the request) is already assigned to another device, and hence duplicates a previously received public key. In one embodiment, this is accomplished by comparing the received device ID, an optional additional device identifier and public key received with the public keys stored in the database 114. If the received public key duplicates a public key stored in the database 114 and is associated with a different device ID or a different additional device identifier than the public key stored in the database, the uniqueness state is determined to be "duplicative." If the received public key does not duplicate a public key stored in the database 114, the received public key is deemed unique and stored in the database 114 along with the device ID and optional additional device identifier associated with that public key. If the received public key duplicates a public key stored in the database 114, but has the same device ID as the public key stored in the database and the same additional device identifier, the uniqueness state is deemed "unique" as the same device has presented its same public key. When the public key is presented in the request within a digital certificate, the validation service 102 can be assured that the device ID (which, among other items, is signed by the CA) has not been tampered with and cloned as well.

The evaluation state also optionally includes a validation state. In this embodiment, the cryptographic asset comprises a digital certificate having the public key and the validation service 102 performs one or more validation checks of the digital certificate, as determined by cryptographic asset requirements stored in the database 114. If any of the one or more validation checks fails, the validation state of the digital certificate is determined to be invalid, and if none of the one or more validation checks fails, the validation state is determined to be valid. The one or more validation checks can include, for example: (1) when the public key is an RSA public key, checking a public exponent of the digital certificate to assure it is one of a set of acceptable values (e.g. that it is relatively prime to p−1 for all primes p which divide the modulus) (2) when the public key is an elliptic curve public key used in elliptic curve cryptography (ECC), checking to assure that the public key is on the elliptic curve.

Referring to FIG. 2, block 206 determines a disposition of the cryptographic asset according to a disposition policy 120 associated with the determined evaluation state and the device 112.

Figure 4A:
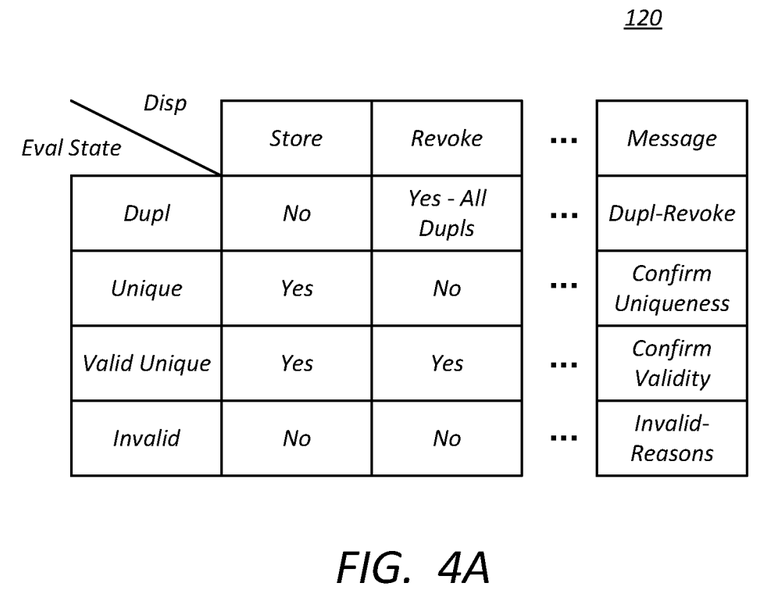
FIGS. 4A and 4B are diagrams illustrating an exemplary tabular implementation of a disposition policy for a particular device.

FIG. 4A is a diagram illustrating an exemplary tabular implementation of a disposition policy 120 for a particular device 112. This disposition policy 120 requires that if the uniqueness state of the cryptographic asset is duplicative, a message is returned to the requesting entity that the cryptographic asset appeared to be a duplicate (clone) and both the cryptographic asset that was the subject of the request and the cryptographic asset stored in the database 114 should be revoked and/or scheduled for renewal. All requests (even those involving duplicates) can be stored in the database for auditing purposes. Cryptographic asset in the database 114 could have been revoked already during a previous duplicate detection. Also illustrated in the disposition policy 120 is that if the cryptographic asset is non-duplicative (globally unique), the cryptographic asset is stored (if not already stored), for example, by adding a record derived from the digital certificate to the database 114, and the stored (and offered) cryptographic assets are not scheduled for revocation. Further, a message is sent to the requesting entity confirming uniqueness.

With respect to validity, the disposition policy 120 indicates that valid (and non-duplicative) the cryptographic asset is stored, not revoked, and a message is transmitted to the requestor indicating that the uniqueness and validity of the asset has been confirmed. Further, if the cryptographic asset is invalid, it is not stored, not scheduled for revocation, but a message is sent indicating that the cryptographic asset is invalid, and the reasons for this invalidity.

Figure 4B:
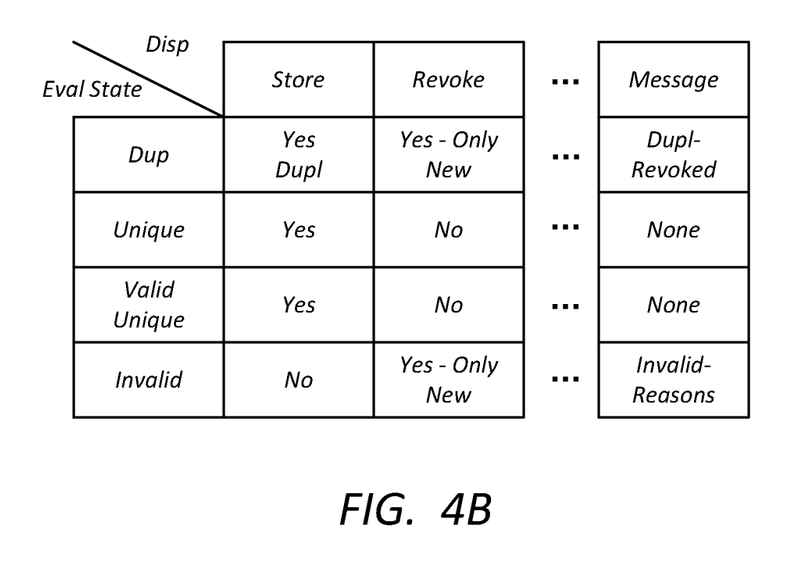

FIG. 4B is a diagram illustrating another tabular implementation of a disposition policy 120. This disposition policy 120 indicates that duplicate cryptographic assets along with their additional device identifier are stored (so as to save data that can be used to identify the sources of the duplicate or cloned cryptographic assets). For example, if a different device 112 provides a digital certificate with a different device ID or a different additional device identifier but the same public key as that of another device, the bogus cryptographic asset is also stored along with its additional device identifier, but as a duplicated asset. The policy 120 also provides that the newly received cryptographic asset is revoked, but in this case, not the cryptographic asset that was previously stored in the database 114, and that a message indicating that the cryptographic asset was a duplicate and has been revoked is sent to the requesting entity. Alternatively, the entity who is sent the last request can be put on hold and the entity is given an opportunity to prove that it is legitimate. After investigation, one of the two or both are revoked. As was the case with respect to the disposition policy 120 summarized in FIG. 4A, unique cryptographic assets are stored, not revoked, but in this case, no message is sent to the requesting entity. Similarly, no message is sent if the cryptographic asset is valid and unique, but if the cryptographic asset is invalid, it is revoked, and a message is sent to the requesting entity indicating the reasons for the revocation.

The illustrated disposition policy 120 is provided for exemplary purposes, and can include many other factors and logical combinations of other factors. The disposition policy 120 may depend on the given environment or context of the device 112 or its operation. For example, the disposition policy 120 may differ between cases of a cryptographic asset received from a factory (or an online provisioning update server, such as OPUS), received from a device 112 deployed in the field but not yet in operation in the network (e.g. an initial deployment) and from a device 112 that has been used in the system for an extended period of time. Further, a different disposition policy 120 can be implemented by device, device type, device manufacturer, or geopolitical boundary.

Returning to FIG. 2, the determined disposition of the cryptographic asset is affected. As described above, this includes storing or rejecting the cryptographic asset from storage, revoking or commanding revocation of the cryptographic asset presented in the request (and optionally cryptographic assets with matching public keys but different device IDs or different additional device identifiers), and sending appropriate messages to the requesting entities.

Since storing large numbers of cryptographic assets can be unwieldy, a shorthand or proxy for the cryptographic asset may be stored and later compared to the cryptographic asset that is part of the request. For example, when a digital certificate is provided as a part of a request and determined to be both unique and valid, a cryptographic hash of the public key may be generated, and the hash and associated device ID stored in the database 114. When another request with another cryptographic asset is offered, a hash (using the same algorithm) of the public key of the newly offered cryptographic asset is generated and compared to the stored hashes of cryptographic assets earlier provided. If the hashes match and are associated with different device IDs, the cryptographic asset is deemed to be duplicative.

Use Cases

A potential use case of the foregoing methods and architecture is as follows: A first party (e.g. a first device 112A wants to authenticate a second party (e.g. second device 112B). Second device 112B provides its digital certificate (certificate A) to the first device 112A. The first device 112A then transmits the second device's digital certificate to the validation service 102 (directly or via a Net Access Authorization System 108) to verify that there are no irregularities with that digital certificate. The validation service 102 keeps a database of certificates previously provided to it by CAs 124, that is further updated with each certificate received with a validation request. The validation service 102 obtains the device ID and public key found in the second device's digital certificate, and checks to assure that the public key is not already stored in the database and associated with a different device ID or digital certificate. If the same public key is found associated with a different device ID or digital certificate (certificate B), the validation service 102 returns and error message to the first device 112A, which may or may not forward the error message to the second device 112B.

Optionally, the validation service 102 may then inform the CA 124 that issued digital certificate A, that the digital certificate has a public key that is duplicative of the public key of certificate B, so the CA 124 can take appropriate action such as revoking certificate A by placing it on a certificate revocation list (CRL). If the CA 124 is also the issuer of certificate B, the CA 124 may also revoke certificate B or place it on the CRL. Alternatively, if the CA 124 of certificate B is different than the CA 124 of certificate B, the CA 124 may inform the other CA 124 of the discrepancy.

The foregoing system and method can also be used by CAs 124 to verify the uniqueness of a requesting entity's public key before signing responding to a certificate signing request. In this embodiment, the CA 124, upon receiving a request to sign data, provides the public key and device ID of the entity making the request to the validation service 102. In this case, if the validation service 102 detects a duplicative key, the CA 124 submitting the request is informed that the public key is not unique, and the CA 124 will deny signing the data and indicate the reasons for this denial.

Hardware Environment

Figure 5:
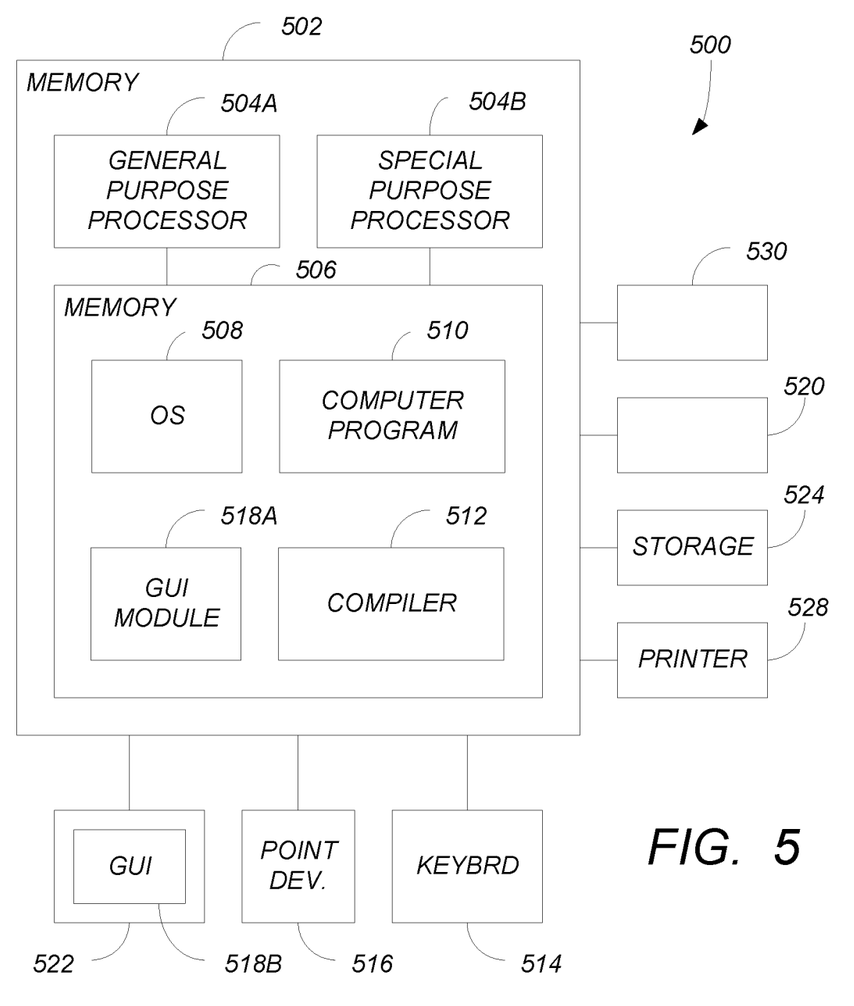
FIG. 5 is a diagram illustrating an exemplary computer system.

FIG. 5 is a diagram illustrating an exemplary computer system 500 that could be used to implement elements of the present invention, including the VS 102, PKI generator 104, CAs 124, factory servers 116, system updater 110, net access authorization system 108, CMTS 122 and devices 112. The computer 502 comprises a general-purpose hardware processor 504A and/or a special purpose hardware processor 504B (hereinafter alternatively collectively referred to as processor 504) and a memory 506, such as random access memory (RAM). The computer 502 may be coupled to other devices, including input/output (I/O) devices such as a keyboard 514, a mouse device 516 and a printer 528.

In one embodiment, the computer 502 operates by the general-purpose processor 504A performing instructions defined by the computer program 510 under control of an operating system 508. The computer program 510 and/or the operating system 508 may be stored in the memory 506 and may interface with the user and/or other devices to accept input and commands and, based on such input and commands and the instructions defined by the computer program 510 and operating system 508 to provide output and results.

Output/results may be presented on a GUI 518B presented on the display 522 or provided to another device for presentation or further processing or action. In one embodiment, the display 522 comprises a liquid crystal display (LCD) having a plurality of separately addressable pixels formed by liquid crystals. Each pixel of the display 522 changes to an opaque or translucent state to form a part of the image on the display in response to the data or information generated by the processor 504 from the application of the instructions of the computer program 510 and/or operating system 508 to the input and commands. Other display 522 types also include picture elements that change state in order to create the image presented on the display 522. The image may be provided through a graphical user interface (GUI) module 518A. Although the GUI module 518A is depicted as a separate module, the instructions performing the GUI functions can be resident or distributed in the operating system 508, the computer program 510, or implemented with special purpose memory and processors.

Some or all of the operations performed by the computer 502 according to the computer program 510 instructions may be implemented in a special purpose processor 504B. In this embodiment, some or all of the computer program 510 instructions may be implemented via firmware instructions stored in a read only memory (ROM), a programmable read only memory (PROM) or flash memory within the special purpose processor 504B or in memory 506. The special purpose processor 504B may also be hardwired through circuit design to perform some or all of the operations to implement the present invention. Further, the special purpose processor 504B may be a hybrid processor, which includes dedicated circuitry for performing a subset of functions, and other circuits for performing more general functions such as responding to computer program instructions. In one embodiment, the special purpose processor is an application specific integrated circuit (ASIC).

The computer 502 may also implement a compiler 512 which allows an application program 510 written in a programming language such as COBOL, C++, FORTRAN, or other language to be translated into processor 504 readable code. After completion, the application or computer program 510 accesses and manipulates data accepted from I/O devices and stored in the memory 506 of the computer 502 using the relationships and logic that was generated using the compiler 512.

The computer 502 also optionally comprises an external communication device such as a modem, satellite link, Ethernet card, or other device for accepting input from and providing output to other computers.

In one embodiment, instructions implementing the operating system 508, the computer program 510, and/or the compiler 512 are tangibly embodied in a computer-readable medium, e.g., data storage device 520, which could include one or more fixed or removable data storage devices, such as a zip drive, floppy disc drive 524, hard drive, CD-ROM drive, tape drive, or a flash drive. Further, the operating system 508 and the computer program 510 are comprised of computer program instructions which, when accessed, read and executed by the computer 502, causes the computer 502 to perform the steps necessary to implement and/or use the present invention or to load the program of instructions into a memory, thus creating a special purpose data structure causing the computer to operate as a specially programmed computer executing the method steps described herein. Computer program 510 and/or operating instructions may also be tangibly embodied in memory 506 and/or data communications devices 530, thereby making a computer program product or article of manufacture according to the invention. As such, the terms "article of manufacture," "program storage device" and "computer program product" or "computer readable storage device" as used herein are intended to encompass a computer program accessible from any computer readable device or media.

Of course, those skilled in the art will recognize that any combination of the above components, or any number of different components, peripherals, and other devices, may be used with the computer 502.

Although the term "computer" is referred to herein, it is understood that the computer may include portable devices such as cellphones, portable MP3 players, video game consoles, notebook computers, pocket computers, or any other device with suitable processing, communication, and input/output capability.

CONCLUSION

This concludes the description of the preferred embodiments of the present invention. The foregoing description of the preferred embodiment of the invention has been presented for the purposes of illustration and description. It is not intended to be exhaustive or to limit the invention to the precise form disclosed. Many modifications and variations are possible in light of the above teaching.

It is intended that the scope of the invention be limited not by this detailed description, but rather by the claims appended hereto. The above specification, examples and data provide a complete description of the manufacture and use of the apparatus and method of the invention. Since many embodiments of the invention can be made without departing from the scope of the invention, the invention resides in the claims hereinafter appended.

What is claimed is:

1. In a system comprising a plurality of commercially distinct entities producing or managing a plurality of devices, each of which includes a processor, a method for preventing use of invalid digital certificates, comprising:
   receiving, in a validation service from a requesting entity, a request to evaluate a digital certificate having a public key, the digital certificate uniquely assigned to one of the plurality of devices by an associated one of the commercially distinct entities, the request comprising the digital certificate;
   determining an evaluation state of the digital certificate at least in part from a database having a plurality of public keys currently assigned to the plurality of devices and previously received by the validation service, the evaluation state having a uniqueness state, the determining of the evaluation state comprising:
      determining if the received public key duplicates of one of the plurality of public keys of the database;
      determining that the uniqueness state is duplicative if the received public key is a duplicate of one of the plurality of public keys of the database;
      determining that the uniqueness state is unique if the received public key is not a duplicate of one of the plurality of public keys of the database; and
   determining a disposition of the digital certificate according to a disposition policy associated with the determined evaluation state and the device; and
   effecting the determined disposition of the digital certificate, comprising:
      if the uniqueness state is unique, adding a record derived from the digital certificate to the database; and
      if the uniqueness state is duplicative, transmitting a message to the requesting entity indicating that the digital certificate is not unique according to the determined uniqueness state and the disposition policy.

2. The method of claim 1, wherein:
the received digital certificate comprises a subject name;
determining that the uniqueness state is duplicative if the received public key duplicates one of the plurality of public keys of the database comprises:
  determining that the uniqueness state is duplicative if the received public key duplicates one of the plurality of public keys of the database and the subject name of the received digital certificate differs from a subject name associated with the duplicating one of the plurality of public keys; and
determining that the uniqueness state is unique if the received public key is not a duplicate of one of the plurality of public keys of the database comprises:
  determining that the uniqueness state is unique if the received public key is not a duplicate of one of the plurality of public keys of the database or if the received public key duplicates one of the plurality of public keys of the database and the subject name of the received digital certificate is the same as a subject name associated with the duplicating one of the plurality of public keys.

3. The method of claim 1, wherein:
the received digital certificate comprises a device name;
determining that the uniqueness state is duplicative if the received public key duplicates one of the plurality of public keys of the database comprises:
  determining that the uniqueness state is duplicative if the received public key duplicates one of the plurality of public keys of the database and the device name of the received digital certificate differs from a subject name associated with the duplicating one of the plurality of public keys; and
determining that the uniqueness state is unique if the received public key is not a duplicate of one of the plurality of public keys of the database comprises:
  determining that the uniqueness state is unique if the received public key is not a duplicate of one of the plurality of public keys of the database or if the received public key duplicates one of the plurality of public keys of the database and the device name of the received digital certificate is the same as a subject name associated with the duplicating one of the plurality of public keys.

4. The method of claim 1, wherein:
the evaluation state further comprises a validation state;
the method further comprises:
  performing one or more validation checks of the digital certificate;
  if any of the one or more validation checks fails, determining the validation state to be invalid; and
  if none of the one or more validation checks fails, determining the validation state to be valid.
wherein:
  if the validation state is invalid, the message transmitted to the requesting entity according to the determined uniqueness state and the disposition policy indicates the invalidity.

5. The method of claim 4, wherein:
the one or more validation checks comprises determining, from the database, if the received digital certificate has been revoked or suspended; and
the disposition policy includes transmitting a message to a source of the request indicating that the certificate is invalid if the received digital certificate has been revoked or suspended.

6. The method of claim 4, wherein:
the public key is an RSA public key;
the one or more validation checks comprises checking a public exponent of the digital certificate; and
the disposition policy includes transmitting a message to a source of the request indicating that the public exponent is unacceptable.

7. The method of claim 4, wherein:
the public key is an elliptic curve public key;
the one or more validation checks comprises checking if the public key is not on the elliptic curve; and
the disposition policy includes transmitting a message to a source of the request indicating that digital certificate is unacceptable if the public key is not on the elliptic curve.

8. The method of claim 1, wherein:
wherein the uniqueness state is duplicative and the validation service modifies the database to revoke the received digital certificate according to the disposition policy.

9. The method of claim 8, wherein:
the validation further transmits a message to one of the plurality of entities that issued the received digital certificate, the message identifying the digital certificate and indicating that the digital certificate had a duplicate private key.

10. The method of claim 9, wherein:
the one of the plurality of entities that issued the received digital certificate revokes the digital certificate.

11. The method of claim 10, wherein:
the one of the plurality of entities that issued the digital certificate further revokes digital certificates having an associated public key equal to the duplicative public key.

12. The method of claim 1, wherein:
the request is received from a certificate authority in response to a request to a certificate signing request; and
the certificate signing request is granted if the uniqueness state is unique and denied if the uniqueness state is duplicative.

13. The method of claim 1, wherein:
the plurality of devices comprises a first device and a second device; and
the request is received from the first device in response to a request to authenticate the second device.

14. In a system comprising a plurality of commercially distinct entities producing or managing a plurality of devices, an apparatus for preventing use of invalid digital certificates, comprising:
a processor;
a memory, communicatively coupled to the processor, the memory comprising processor instructions comprising processor instructions for:
  receiving, in a validation service from a requesting entity, a request to evaluate a digital certificate having a public key, the digital certificate uniquely assigned to one of the plurality of devices by an associated one of the commercially distinct entities, the request comprising the digital certificate;
  determining an evaluation state of the digital certificate at least in part from a database having a plurality of public keys currently assigned to the plurality of devices and previously received by the validation service, the evaluation state having a uniqueness state, the determining of the evaluation state comprising:
  determining if the received public key duplicates of one of the plurality of public keys of the database;
  determining that the uniqueness state is duplicative if the received public key is a duplicate of one of the plurality of public keys of the database;
  determining that the uniqueness state is unique if the received public key is not a duplicate of one of the plurality of public keys of the database; and
  determining a disposition of the digital certificate according to a disposition policy associated with the determined evaluation state and the device; and
  effecting the determined disposition of the digital certificate, comprising:
    if the uniqueness state is unique, adding a record derived from the digital certificate to the database; and
    if the uniqueness state is duplicative, transmitting a message to the requesting entity indicating that the digital certificate is not unique according to the determined uniqueness state and the disposition policy.

15. The apparatus of claim 14, wherein:
the received digital certificate comprises a subject name;
the processor instructions for determining that the uniqueness state is duplicative if the received public key duplicates one of the plurality of public keys of the database comprise processor instructions for:
  determining that the uniqueness state is duplicative if the received public key duplicates one of the plurality of public keys of the database and the subject name of the received digital certificate differs from a subject name associated with the duplicating one of the plurality of public keys; and
the processor instructions for determining that the uniqueness state is unique if the received public key is not a duplicate of one of the plurality of public keys of the database comprise processor instructions for:
  determining that the uniqueness state is unique if the received public key is not a duplicate of one of the plurality of public keys of the database or if the received public key duplicates one of the plurality of public keys of the database and the subject name of the received digital certificate is the same as a subject name associated with the duplicating one of the plurality of public keys.

16. The apparatus of claim 14, wherein:
the received digital certificate comprises a device name;
the processor instructions for determining that the uniqueness state is duplicative if the received public key duplicates one of the plurality of public keys of the database comprise processor instructions for:
  determining that the uniqueness state is duplicative if the received public key duplicates one of the plurality of public keys of the database and the device name of the received digital certificate differs from a subject name associated with the duplicating one of the plurality of public keys; and
the processor instructions for determining that the uniqueness state is unique if the received public key is not a duplicate of one of the plurality of public keys of the database comprise processor instructions for:
  determining that the uniqueness state is unique if the received public key is not a duplicate of one of the plurality of public keys of the database or if the received public key duplicates one of the plurality of public keys of the database and the device name of the received digital certificate is the same as a subject name associated with the duplicating one of the plurality of public keys.

17. The apparatus of claim 14, wherein:
the evaluation state further comprises a validation state;
the processor instructions further comprise processor instructions for:
  performing one or more validation checks of the digital certificate;
  if any of the one or more validation checks fails, determining the validation state to be invalid; and
  if none of the one or more validation checks fails, determining the validation state to be valid.
wherein:
  if the validation state is invalid, the message transmitted to the requesting entity according to the determined uniqueness state and the disposition policy indicates the invalidity.

18. The apparatus of claim 17, wherein:
the one or more validation checks comprises determining, from the database, if the received digital certificate has been revoked or suspended; and
the disposition policy includes transmitting a message to a source of the request indicating that the certificate is invalid if the received digital certificate has been revoked or suspended.

19. The apparatus of claim 17, wherein:
the public key is an RSA public key;
the one or more validation checks comprises checking a public exponent of the digital certificate; and
the disposition policy includes transmitting a message to a source of the request indicating that the public exponent is unacceptable.

20. The apparatus of claim 17, wherein:
the public key is an elliptic curve public key;
the one or more validation checks comprises checking that the public key is on the elliptic curve; and
the disposition policy includes transmitting a message to a source of the request indicating that digital certificate is unacceptable.

21. The apparatus of claim 14, wherein:
wherein the uniqueness state is duplicative and the validation service modifies the database to revoke the received digital certificate according to the disposition policy.

22. The apparatus of claim 21, wherein:
the validation further transmits a message to one of the plurality of entities that issued the received digital certificate, the message identifying the digital certificate and indicating that the digital certificate had a duplicate private key.

23. The apparatus of claim 22, wherein:
the one of the plurality of entities that issued the received digital certificate revokes the digital certificate.

24. The apparatus of claim 23, wherein:
the one of the plurality of entities that issued the digital certificate further revokes digital certificates having an associated public key equal to the duplicative public key.

25. The apparatus of claim 14, wherein:
the request is received from a certificate authority in response to a request to a certificate signing request; and the certificate signing request is granted if the uniqueness state is unique and denied if the uniqueness state is duplicative.

26. The apparatus of claim 14, wherein:

the plurality of devices comprises a first device and a second device; and the request is received from the first device in response to a request to authenticate the second device.

* * * * *